United States Patent [19]

Cushing

[11] Patent Number: 4,911,339
[45] Date of Patent: Mar. 27, 1990

[54] BICYCLE WATER PUMP

[76] Inventor: John J. Cushing, 610 N. Buttonwood, Anaheim, Calif. 92805

[21] Appl. No.: 218,700

[22] Filed: Jul. 13, 1988

[51] Int. Cl.$^4$ .......................................... F04B 33/00
[52] U.S. Cl. .................... 222/610; 222/628; 222/401; 280/288.4; 280/304.5
[58] Field of Search ................. 222/608–610, 222/628, 209, 211, 212, 215, 401, 402, 175, 383; 224/30 R, 30 A, 31, 35, 36, 37, 38, 79, 41; 239/172, 327, 337, 373; 280/288.4, 304.5

[56] References Cited

U.S. PATENT DOCUMENTS

| | | | |
|---|---|---|---|
| 418,933 | 1/1890 | Sommerville | 416/55 |
| 510,036 | 12/1893 | Lowth | 280/289 |
| 581,767 | 5/1897 | Powers | 222/130 |
| 645,482 | 3/1900 | Mills | 416/55 |
| 681,565 | 8/1901 | McCune et al. | 416/55 |
| 803,635 | 11/1905 | Stahlhut | 416/55 |
| 905,642 | 12/1908 | Brooks | 277/289 |
| 1,003,122 | 9/1911 | Pasley . | |
| 1,255,875 | 2/1918 | Guerard | 417/233 |
| 1,584,725 | 5/1926 | Brandstetter | 417/233 |
| 1,617,017 | 2/1927 | Dudley . | |
| 1,861,996 | 6/1932 | Anderson . | |
| 3,023,969 | 3/1962 | Hudson et al. . | |
| 3,107,069 | 10/1963 | Draim | 239/154 X |
| 3,323,689 | 6/1967 | Elmore | 222/209 X |
| 3,677,446 | 7/1972 | Guyer, Jr. et al. | 222/610 |
| 3,741,429 | 6/1973 | Purdell, Jr. et al. | 248/214 |
| 3,777,955 | 12/1973 | Davies | 224/35 |
| 3,840,153 | 10/1974 | Devlin | 222/211 |
| 3,910,126 | 10/1975 | Fedler | 280/289 |
| 4,009,810 | 3/1977 | Shook | 224/32 |
| 4,095,812 | 6/1978 | Rowe | 224/35 X |
| 4,185,670 | 1/1980 | Sartell, Jr. | 280/289 |
| 4,192,464 | 3/1980 | Chow | 239/373 |
| 4,274,566 | 6/1981 | Rowe | 224/35 |
| 4,345,704 | 8/1982 | Boughton | 224/39 |
| 4,386,721 | 6/1983 | Shimano | 224/39 |
| 4,420,097 | 12/1983 | Motsenbocker | 222/131 |
| 4,441,638 | 4/1984 | Shimano | 224/35 |
| 4,555,911 | 12/1985 | Kusisto | 62/241 |
| 4,629,098 | 12/1986 | Eger | 222/175 |
| 4,640,449 | 2/1987 | Blackburn | 224/41 |
| 4,765,542 | 8/1988 | Carlson | 239/289 |
| 4,815,635 | 3/1989 | Porter | 280/288.4 X |

FOREIGN PATENT DOCUMENTS 514211  2/1955  Italy .................................. 224/30 A Primary Examiner—Joseph J. Rolla
Assistant Examiner—David H. Bollinger
Attorney, Agent, or Firm—Knobbe, Martens, Olson & Bear

[57] ABSTRACT

A liquid dispensing apparatus, suitable for mounting on a bicycle safely provides the rider of the bicycle a way to refresh himself without having to stop and dismount the bicycle. In a preferred embodiment, the apparatus generally includes a cylindrical housing containing a supply of liquid. The liquid is dispensed through an unrestricted length of flexible tubing, leading from the housing to a nozzle which is disposed on the handle bars of the bicycle. A pleated bellows is disposed at the bottom of the housing and forms a chamber for holding compressed air. Each inward stroke of the bellows forces air into the chamber so as to hold the contents under pressure. Adjacent the nozzle, and integrally connected thereto is a hand operated valve which, in its normal state is closed. Depressing the valve forces the liquid out of the container, through the tubing and nozzle, to the rider.

5 Claims, 4 Drawing Sheets

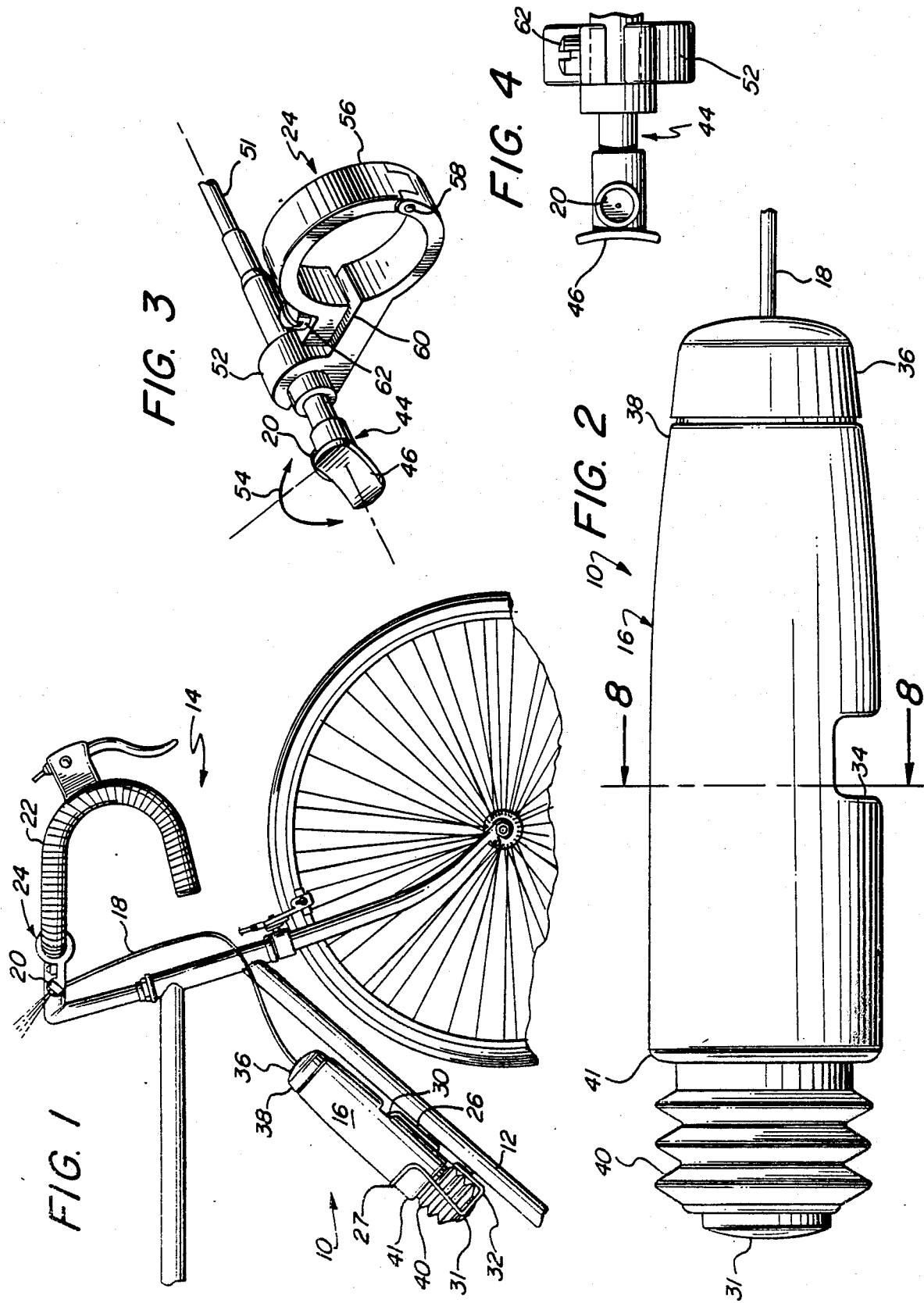

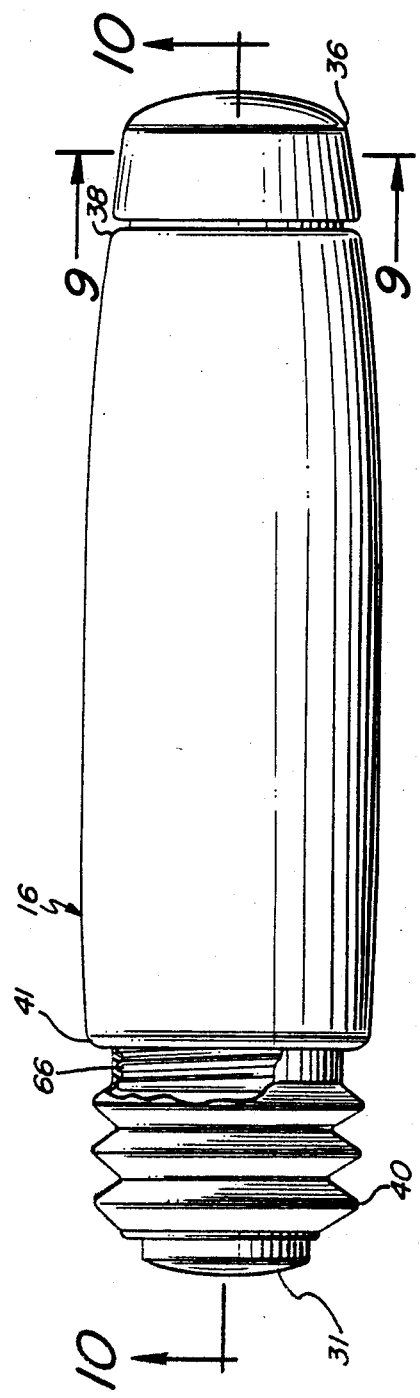
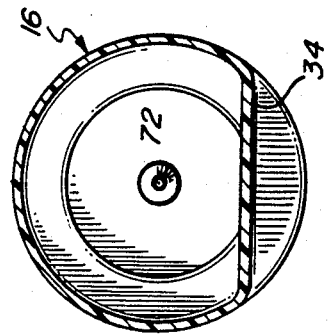
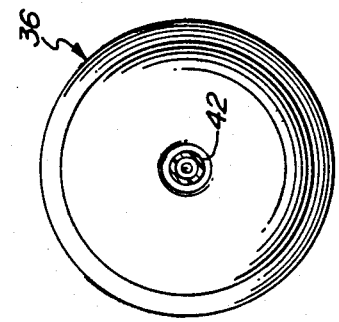
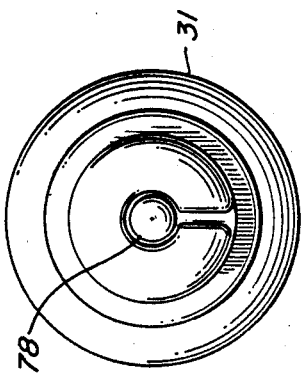

4,911,339

BICYCLE WATER PUMP

BACKGROUND OF THE INVENTION

The present invention relates generally to a portable container for dispensing liquids. More specifically, the present invention relates to a hand pressurized water pump and sprayer, suitable for mounting on a bicycle.

It is often times desirable to refresh oneself and/or quench one's thirst without the need to stop and dismount the bicycle. It is well known in the art to mount a water bottle to the frame of a bicycle which is selectively removable by the rider. At the rider's discretion, the water, or other liquid disposed within the container, may be consumed to quench the rider's thirst or poured over the rider's body to effect cooling.

When drinking from a container of this nature, the rider's view of the road is greatly distracted, the rider must tilt his head backward in order to obtain a drink. A hazard also exists when the rider pours the contents of the container over his body to effect cooling, as the excess water which spills onto the road may loosen the oils and other slippery substances on the road, and may cause the bicycle to slide. Further, during either of these activities, as well as during removal and replacement of the container, the rider is forced to steer and balance the bicycle with only one hand. Moreover, the rider's attention is further distracted from the road while reaching for the container or replacing the container, as it is generally located on the lower part of the support frame.

Another prior art device is a water bottle connected to an extensible drinking straw as disclosed in U.S. Pat. No. 4,095,812 to Rowe. This retractable straw allows the rider to drink the liquid contained within the container by simply sucking on the straw. While the retractable straw solves the problem associated with the backward tilting of one's head to obtain a drink from the water bottle described above, this device is also distracting and unsafe. Thus, prior to drinking from the straw, the rider must either grope blindly for the straw or divert his attention from the road so as to locate and grasp the straw. This reaching movement may have detrimental effects on the rider's balance and view of the road. Further, the straw does not provide the rider with a means for cooling his body while riding the bicycle.

Accordingly, with the existing art, it continues to be unsafe for the rider of a bicycle to obtain a drink while riding, as the rider's attention must be diverted when reaching for either the water bottle or the extensible straw of the aforementioned devices. Additionally, reaching for either the bottle or the straw forces the rider to steer the bicycle with only one hand, thereby lessening his control over the bicycle, a factor which necessitates a reduction in speed in order to proceed safely.

SUMMARY OF THE INVENTION

Briefly, the present invention provides a novel bicycle water pump which is readily affixed to the frame of a variety of bicycles of ordinary construction, and which eliminates many of the hazards associated with prior art bicycle water dispensers. The bicycle water pump of the present invention provides a cyclist with a means to safely quench his thirst and cool down his body without requiring the rider to dismount the bicycle. Additionally, the water pump of the present invention occupies a comparatively small space when properly positioned on the bicycle frame and in no way interferes with the normal operation of the bicycle.

The invention, in its preferred embodiment includes a cylindrical water pump having a hand operated valve and sprayer disposed upon the handle bars of the bicycle, within easy reach of the rider. The water pump of the present invention comprises a pressurized cylindrical container, having both ends screw threaded, a hand operated valve, integrally connected to a sprayer nozzle, and interconnecting tubing, all of which may be mounted on a bicycle. The pressurized container acts as a pump for the liquid disposed therein, and the internal pressure of the container is used to force a stream of liquid from the container, toward the rider's mouth.

Preferably, the hand operated valve and nozzle assembly is removably secured to the handle bars of the bicycle, within easy reach of the rider. Once the hand operated valve is opened, the pressure in the container forces the liquid from the container and toward the rider. Since the hand operated valve is located on the handle bars, use of the present invention does not distract the rider's attention, nor does it require the rider to remove his hand from the handle bars.

A support cage, adapted to removably receive and retain the container, is mounted onto a bicycle frame. When the container is inserted into the cage, it is angled rearwardly or inwardly so that its lower portion passes between the outer edge of the cage and a catch. When the bottom of the container engages the lower arms of the cage, the catch will be in engagement with a notched surface near the middle of the container and will serve to retain the container in place. This retention is further aided by the frictional engagement of the support cage with opposite sides of the container.

BRIEF DESCRIPTION OF THE DRAWINGS

FIG. 1 is a partial side view of a bicycle equipped with a water pump in accordance with a preferred embodiment of the present invention;

FIG. 2 is a side view of a pressurized container as used in the present invention, suitable for storing potable liquids;

FIG. 3 is an isometric view of a hand operated valve and nozzle arrangement, friction fit into a clamp which is adapted to secure the valve and nozzle to the handle bars of the bicycle;

FIG. 4 is a front view of the hand operated valve and nozzle assembly depicted in FIG. 3;

FIG. 5 is a side view of the container depicted in FIG. 2, rotated 180° from the notched side;

FIG. 6 is a bottom view of the pressurized container depicted in FIGS. 1, 2 and 5;

FIG. 7 is a top view of the pressurized container depicted in FIG. 1, 2 and 5;

FIG. 8 is a cross sectional view, taken along line 8—8 of FIG. 2;

DETAILED DESCRIPTION OF THE PREFERRED EMBODIMENT

Figure 9:
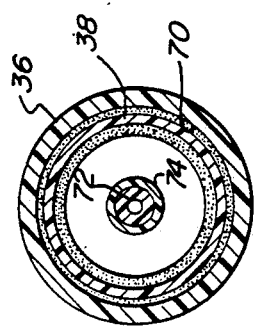
FIG. 9 is a cross sectional view, taken along line 9—9 of FIG. 5.

Referring now to the drawings in detail, wherein like reference numerals designate like elements throughout the several views thereof, there is shown generally at 10 a water pump embodying the present invention in a preferred form, mounted on the frame 12 of a bicycle 14 of ordinary construction. As shown in FIG. 1, the water pump 10 of the present invention generally includes an elongate, substantially cylindrical housing 16, suitable for containing a supply of liquid, and a length of flexible tubing 18, leading from the cylindrical container 16 to a nozzle 20 which is secured to the handle bars 22 of the bicycle 14 by a clamping means 24.

A support cage 26, is adapted to removably receive and retain the container 16, and is mounted onto the lower support frame 12 of the bicycle. This cage 26 includes an upper, semicircular member 27, an end arm 32, and lower catch 30. When the container 16 is inserted into the cage 26, it is angled rearwardly or inwardly so that its lower portion passes between the upper member 27 of the cage 26 and the catch 30. When the bottom 31 of the water pump 10 engages the end arm 32 of the cage 26, the catch 30 will be in engagement with a notch 34, formed in the surface of the container 16, near its longitudinal center to retain the water pump 10 in place on the frame 12 of the bicycle 14. This retention is further aided by dimensioning the cage 26 such that it makes frictional engagement with opposite sides of the water pump 10.

As shown in FIGS. 1, 2 and 5, the water pump 10 has a lid portion 36, disposed near the top 38 of the container 16 and a pleated bellows portion 40, disposed near the bottom 41 of the container 16. Preferably, both the lid 36 and the pleated bellows 40 are screw threaded to opposite ends 38, 41, respectively, of the container 16, so as to be removably secured thereto. A length of flexible tubing 18 extends from an aperture 42 in the center of the lid portion 36 and outwardly. The flexible tubing 18 should be of a sufficient length, such that when the pump 10 is operatively attached to the bicycle 14, a continuous path is formed between the container 16 and the hand operated valve and nozzle assembly 44.

As best seen in FIGS. 3 and 4, the valve and nozzle assembly 44 comprises a sprayer nozzle 20 and a hand operated valve 46, disposed adjacent one end of the assembly 44, and integrally connected thereto. The opposite end of the assembly 44 is an elongate tubular member 51, adapted to be inserted into the flexible tubing 18, so as to complete the path from the container 16 to the nozzle 20. Preferably, the flexible tubing 18 is of a sufficiently large diameter, so as to enable the tubular member 51 to be inserted into the flexible tubing 18, yet of a sufficiently small diameter so that a friction fit is formed therebetween.

The hand operated valve and nozzle assembly 44 is adapted to be secured to the handle bars 22 of an ordinary bicycle 14 by a clamping means 24. The clamping means 24 comprises a C-shaped portion 52, adapted to removably receive and retain the hand operated valve and nozzle assembly 44. The C-shaped portion 52 of the clamp 24 allows the nozzle 20 to be rotated, as shown by the directional arrows 54 in FIG. 3, so as to enable the user to adjust the direction of the stream of liquid which will be forced from the nozzle 20 when the hand operated valve 46 is actuated. The clamp 24 also includes a circular portion 56, having a hinged portion 58 which enables the circular portion 56 to be opened into two semi-circular portions, and a flat portion 60 having apertures (not shown) therethrough, adapted to receive a screw 62 so as to secure the clamp 24 to the handle bars 22 of the bicycle 14. The circular portion 56 of the clamp 24 is sized so as to form a snug fit with the handle bars 22, such that, once the screw 62 is tightened, the clamp 24 is held securely in place, and is not allowed to rotate about the handlebars 22.

Figure 11:
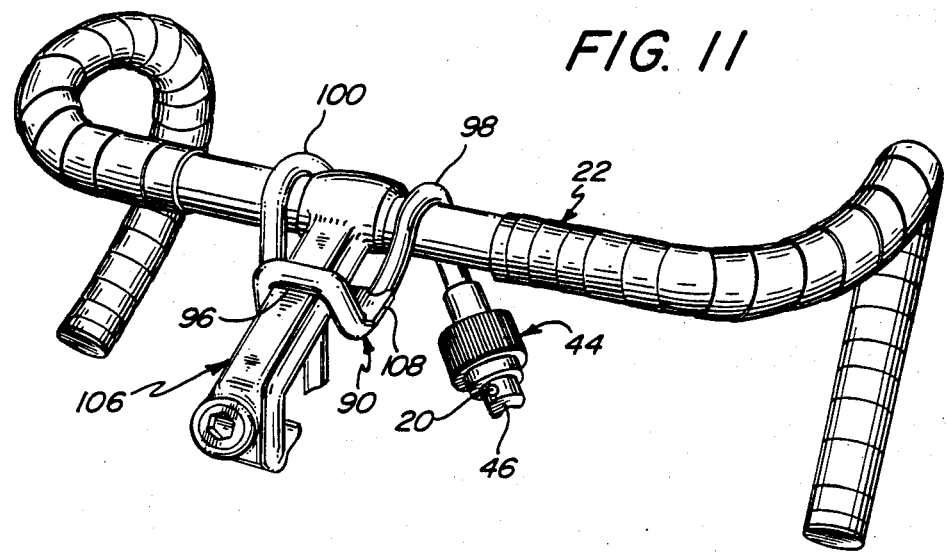
FIG. 11 is a perspective view of the handlebars of a bicycle, showing an alternative clamping device for securing the nozzle thereto.
Figure 12:
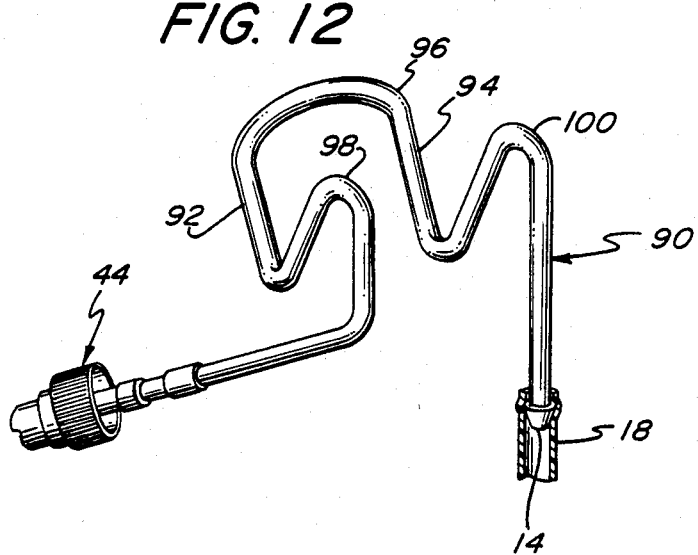
FIG. 12 is a perspective view of the clamping device shown in FIG. 11.
Figure 13:
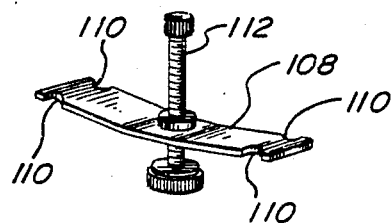
FIG. 13 is a perspective view of the means for securing the clamping device of FIGS. 11 and 12 to the handlebars of the bicycle.

In an alternative embodiment, the water pump of the present invention may be provided with a clamping means 90 which is integrally connected to the hand operated valve and nozzle assembly 44 as shown in FIGS. 11 and 12. In this embodiment, the clamp 90 comprises a length of rigid tubing, forming two parallel rounded V-shaped curves 92, 94 which are integrally joined at the front end 96. The rear n-shaped portions 98, 100 are adapted to rest on the handlebars 22, while the frontal V-shaped portions 92, 94 straddle the goose neck portion 106 of the bicycle, with the front end 96 resting thereon. A screw threaded metal bar 108, as illustrated in FIG. 13, having hemispherical notches 110 for receiving and retaining the tubing at the V-shaped portions 92, 94 is provided to secure the clamp 90 about the goose neck 106 by tightening the screw 112. The flexible tubing 18 may then be friction fit over the chamfered end 114 of the clamping device 90, so as to complete the path from the water pump 10 to the nozzle 20.

Figure 10:
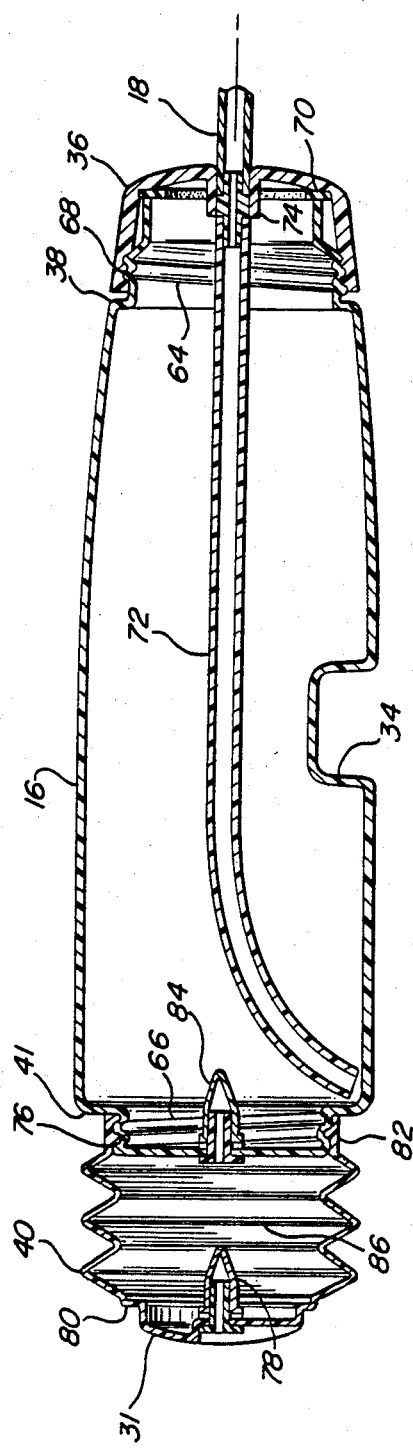
FIG. 10 is a cross sectional view, taken along line 10—10 of FIG. 5.

FIG. 10 shows a cross sectional view of the water pump 10 of the present invention. As shown in the drawing, both ends 38, 41 of the container 16 exhibit threaded collars 64, 66, respectively. The lid portion 36 of the container 16 possesses associated threads 68 so as to enable the user to easily twist the lid 36 on and off, for the purposes of filling the container 16 with a potable liquid, or emptying the contents thereof. Disposed within the lid 36 is a washer 70. The washer 70 is secured to the inner part of the lid by a suitable adhesive so as to aid in the formation of an air tight seal when the lid 36 is screwed onto the container 16. A second length of tubing 72 is friction fit into a second washer 74 disposed near the center of the lid, in alignment with the aperture 42 through which the unrestricted length of flexible tubing 18 passes. This second length of tubing 72 extends toward the bottom 41 of the container 16, so that liquid is suctioned from the bottom 41 of the container 16 when the hand operated valve 46 is actuated.

Like the lid portion 36, the pleated bellows portion 40 also has a threaded portion 76 which mates with the associated threaded collar 66, disposed at the bottom 41 of the container 16. A first check valve 78 is disposed at one end 80 of the pleated bellows portion 40. This first check valve 78 is an air intake valve, which allows air to enter the pleated bellows 40, so as to pressurize the contents of the container, but does not allow air to exit. At the other end 82 of the pleated bellows 40 is a second check valve 84. The second check valve 84 allows pressurized air to enter the container 16, yet prevents the liquid contents disposed therein from being suctioned into the pleated bellows 40 while the device 10 is being pressurized.

In operation, the circular portion 56 of the clamping means 24 is fitted around the handle bars 22 of the bicycle 14, and secured there to by tightening the screw 62 through the apertures in the flat portion 60 of the clamp 24. Care should be taken to ensure that the C-shaped portion 52 faces toward the rear of the bicycle. The support cage 26 should also be mounted to the lower support frame 12 of the bicycle 14 at this time.

The lid 36 is twisted off the top 38 of the container 16, so as to provide an opening in the container suitable for receiving a potable liquid, for example, water. After filling, the lid 36 is twisted back onto the container 16 and tightened, so as to create an air tight atmosphere within the container. The water pump 10 is then presurized by repeatedly forcing the pleated bellows portion 40 toward the container 16. Each inward thrust of the bellows 40 forces air past the first check valve 78, into a chamber 86 for compressed air and through the second check valve 84 into the container 16. The nature of the second check valve 84, allows air to flow in only one direction, and therefore, the liquid contents of the container is not allowed to enter the bellows chamber 86. Each successive inward thrust of the bellows 40 offers increased resistance due to an increase in compressed air within the container 16 and bellows chamber 86.

Once the device 10 has been pressurized, it is ready to be inserted into the support cage 26 already mounted onto the bicycle frame 12, in the manner described above. The hand pressurized valve and nozzle assembly 44 is friction fit into the C-shaped portion 52 of the clamp 24, and adjusted so that the stream of liquid which emanates therefrom will be directed toward the rider's upper body and/or mouth.

During cycling, when the rider wishes to refresh himself, he simply depresses the hand operated valve 46 to cause a stream of water, or other potable liquid disposed within the pressurized container to be ejected from the container 16, through the flexible tubing 18 and nozzle 20, and to the rider. Since the interior tubing 72 extends to the bottom 41 of the container 16, the pressurized contents of the container 16 will be forced through the inner tubing 72, to the exterior flexible tubing 18, and out the nozzle 20 when the hand operated valve 46 is actuated.

Advantageously, the hand operated valve 46 is secured to the handle bars 22 of the bicycle 14, and thus, the rider need not divert his attention from the road to use the device 10 of the present invention. This is a significant safety improvement over prior art devices. Furthermore, the nozzle 20 is adapted to dispense a controlled amount of liquid with each depression of the hand operated valve 46, so that excessive amounts of water are not spilled onto the road, thereby providing increased safety to the rider of the bicycle.

It will be appreciated that certain structural variations may suggest themselves to those skilled in the art. The foregoing detailed description is to be clearly understood as given by way of illustration, the spirit and scope of this invention being limited solely by the appended claims.

What is claimed is:

1. A portable liquid dispensing apparatus constructed and arranged for attachment to a bicycle, said bicycle including a frame and handle bars, said apparatus adapted to provide liquid refreshment to the rider of said bicycle without requiring the rider to stop and dismount said bicycle, said apparatus comprising:

a substantially cylindrical container, suitable for storing a potable liquid;

a hand operated valve, selectively actuated at the rider's discretion by depressing said valve, wherein said valve is normally held in a closed position, so as to prevent said potable liquid disposed within said container from passing through said valve, and wherein depressing said valve allows said potable liquid to flow through said valve;

a first length of flexible tubing, said first length of flexible tubing extending from said container to said hand operated valve, so as to form a pat through which said potable liquid may flow;

a second length of flexible tubing, disposed within said container and retrofit into washer disposed at the top of said container, said second length of flexible tubing extending toward the bottom of said container;

a nozzle, integrally connected to said hand operated valve, said nozzle providing an outlet for said liquid contents of said container upon actuation of said hand operated valve, said nozzle adjusted so as to direct a stream of liquid emanating therefrom toward the rider of said bicycle;

a pleated bellows portion, secured to the bottom of said container, said pleated bellows portion having first and second ends and said second end attached to a bottom of said container thereby forming a chamber for pressurized air;

an air intake check valve, disposed at said first end of the pleated bellows portion, said intake check valve adapted to allow air into said chamber during expansion of said pleated bellows portion after each inward thrust thereof; and a second check valve, disposed at said second end, said second check valve adapted to prevent said liquid contents within said container from being suctioned into said chamber when said pleated bellows portion is being pumped to pressurize said container.

2. An apparatus as defined by claim 1, wherein said pleated bellows is threaded onto said container.

3. An apparatus as defined by claim 1, wherein said container is provided with a twist off lid, so as to provide an opening for receiving said potable liquid.

4. An apparatus as defined by claim 1, wherein said container further comprises a notched portion, disposed near the longitudinal center of said container, said notched portion adapted to receive a catch from a support cage, secured to said bicycle, so as to retain the container in place on the frame of said bicycle.

5. An apparatus as defined by claim 1, wherein said hand operated valve and nozzle are integrally connected and secured to the handle bars of the bicycle by a clamping means, so as to locate said hand operated valve within easy reach of the rider of said bicycle to operate said apparatus without diverting has attention from the road.

* * * * *

UNITED STATES PATENT AND TRADEMARK OFFICE
CERTIFICATE OF CORRECTION

PATENT NO. : 4,911,339
DATED      : March 27, 1990
INVENTOR(S): John J. Cushing

It is certified that error appears in the above-identified patent and that said Letters Patent is hereby corrected as shown below:

Column 3, line 14, change "housing !6" to --housing 16--.

Column 6, line 14, change " a pat" to --a path--.

Column 6, line 60, change "has attention" to --his attention--.

Signed and Sealed this

Seventh Day of April, 1992

Attest:

HARRY F. MANBECK, JR.

*Attesting Officer*      *Commissioner of Patents and Trademarks*